July 9, 1957 A. LOTT 2,798,251
APPARATUS FOR REMOVING MEAT FROM BONES
Filed June 25, 1956 2 Sheets-Sheet 2

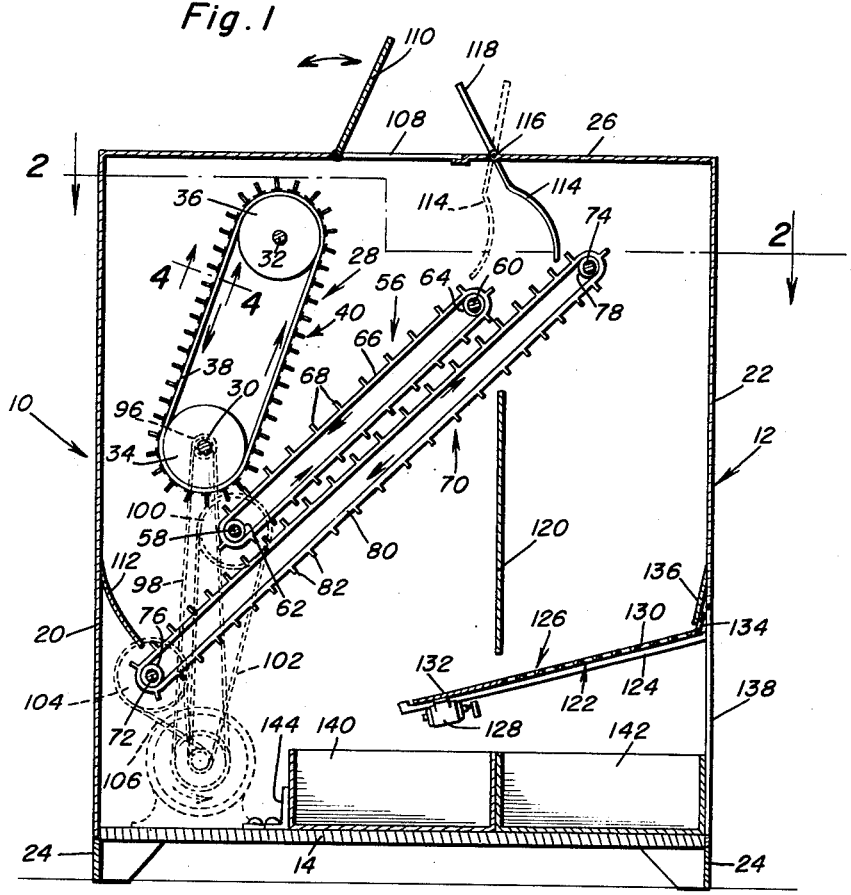

Alex Lott
INVENTOR.

United States Patent Office 2,798,251
Patented July 9, 1957

2,798,251
APPARATUS FOR REMOVING MEAT FROM BONES
Alex Lott, Natchez, Miss.
Application June 25, 1956, Serial No. 593,694
4 Claims. (Cl. 17—1)

This invention relates in general to new and useful improvements in butchering apparatus, and more specifically to an improved apparatus for removing meat from bones.

In a normal butchering operation where the meat is being de-boned, after the bone has been removed, it carries a certain amount of meat which may be salvaged for use in making hamburger, lunch meats and the like. Heretobefore the only practical method of removing meat from the bone was to take and cut the meat from the bone using a de-boning knife. However, the process is relatively slow and in view of the high wages paid at the present time is a costly one.

It is therefore the primary object of this invention to provide an improved apparatus which is so constructed whereby bones carrying meat may be placed therein and through an automatic operation the meat may be removed from the bones and separated from such bones so that the end product of the apparatus is a receptacle of bones and a receptacle of meat removed from said bones.

Another object of this invention is to provide an improved de-boning apparatus, the de-boning apparatus including at least a pair of conveyors disposed in converging relation and running in opposite directions whereby the bones carrying meat are moved past a plurality of moving knives, the action of the knives with respect to the bones being such that the meat carried by the bones is removed therefrom.

Still another object of this invention is to provide an improved meat removing apparatus for removing meat from bones, the apparatus being so constructed whereby the bones may be re-passed by knives a desired number of times in order that all of the meat carried by the bones may be removed therefrom.

A further object of this invention is to provide an improved meat removing apparatus for removing meat from bone, the apparatus including moving knives and conveyor means for removing bones carrying meat relative to the knives, there being provided a suitable screen for catching the meat and bones and for separating the meat from the bones whereby the meat removing operation is complete and automatic.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view taken through a housing portion of the meat removing apparatus along section line 1—1 of Figure 2 and shows the general arrangement of the conveyors thereof and the means for separating the bones and meat, a gate for controlling the re-passing of bones and meat relative to the meat removing knives being shown in solid lines in a return position and in dotted lines in a closed position, and drive means for the apparatus which are disposed exteriorly of the housing being shown by dotted lines.

Figure 2 is a transverse horizontal sectional view taken substantially upon the plane indicated on the section line 2—2 of Figure 1 and shows the general relationship of the various components of the apparatus;

Figure 4:
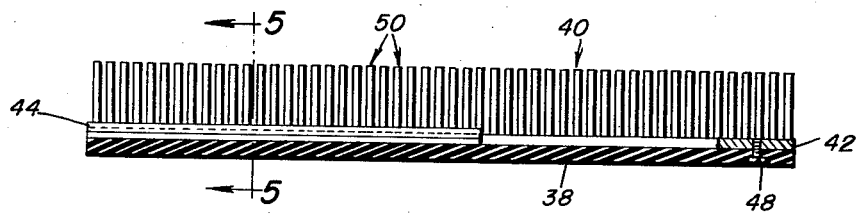
Figure 4 is an enlarged fragmentary sectional view taken substantially upon the plane indicated by the section line 4—4 of Figure 1 and shows the general cross section of a first conveyor which carries knives for removing of meat from the bones.
Figure 5:
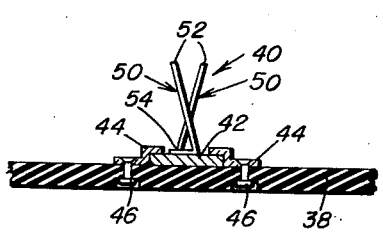
Figure 6:
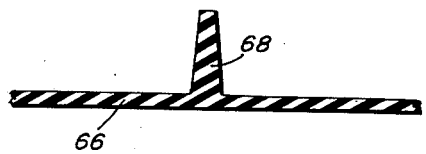

Figure 5 is an enlarged fragmentary sectional view taken substantially upon the plane indicated by the section line 5—5 of Figure 4 and shows the manner in which the knives are mounted on a removable plate so that the knives may be individually sharpened or replaced; and Figure 6 is an enlarged fragmentary sectional view taken substantially upon the plane indicated by section line 6—6 of Figure 2 and shows the specific cross section of a second conveyor belt which is utilized for moving bones and meat past the knives of the first conveyor.

Referring now to the drawings in detail, it will be seen that there is illustrated primarily in Figures 1 and 2 the meat removing apparatus which is the subject of this invention, the apparatus being referred to by the reference numeral 10. The meat removing apparatus 10 includes a suitable support which is in the form of a housing referred to in general by the reference numeral 12.

The housing 12 includes a bottom wall 14 which has extending upwardly therefrom side walls 16 and 18 and end walls 20 and 22. The bottom wall 14 is retained in an elevated position by suitable feet 24 disposed at opposite corners thereof. The housing 12 also includes a top wall 26.

Mounted within the housing 12 is a plurality of conveyors which includes a first conveyor, which is referred to in general by the reference numeral 28. The conveyor 28 is disposed in the upper left hand corner of the housing, as is best illustrated in Figure 1. The conveyor 28 slopes upwardly and to the right and includes a drive shaft 30, and idler shaft 32, the shafts 30 and 32 being suitably journalled in the side walls 16 and 18 between which they extend. Carried by the drive shaft 30 is a driving drum 34. An idler drum 36 is carried by the idler shaft 32. Entrained over the drums 34 and 36 is a flexible endless belt 38.

Carried by the endless belt 38 is a plurality of knife assemblies 40. As is best illustrated in Figures 4 and 5, each knife assembly 40 includes an elongated plate 42 which extends transversely of the endless belt 38 and which is positioned thereon by a pair of Z-shaped guides 44. The guides 44 are secured to the belt 38 by means of suitable fasteners 46. The plate 42 is retained against sliding movement out of the guides 44 by means of a fastener 48, which is best illustrated in Figure 4.

Carried by each of the plates 42 is a plurality of relative narrow knife members 50. Each of the members 50 includes a blade portion 52 and a mounting flange 54. It is to be noted that each blade portion 52 is disposed at a slight angle from a normal position with respect to the plate 42 and that alternate knife members 50 are so mounted whereby their blades 52 are disposed in crisscross relation. This permits a maximum cutting operation for removing meat from bones.

Mounted within the housing 12 below and to the right of the first conveyor 28 is a second conveyor which is referred to in general by the reference numeral 56. The second conveyor 56 includes a drive shaft 58 and an idler shaft 60, the shafts 58 and 60 extending between and journalled in the side walls 16 and 18. Carried by the drive shaft 58 is a driving drum 62. An idler drum 64 is carried by the idler shaft 60. Entrained over the drums 62 and 64 is an endless belt 66 which carries a plurality of transversely extending cleats 68. The construction of the cleats 68 with respect to the belts 66 is best illustrated in Figure 6.

It is to be noted that the second conveyor 56 extends upwardly and to the right like the conveyor 28. However, the conveyor 56 extends at a lesser angle to the horizontal than the conveyor 28 so that the conveyors 56 and 28 converge downwardly. The lower parts of the conveyors 28 and 56 are disposed closely adjacent each other.

Carried by the housing 12 is a third conveyor which is referred to in general by the reference numeral 70. The conveyor 70 underlies the conveyor 56 and is disposed in parallel relation with respect thereto. It is to be noted that the conveyor 70 is longer than the conveyor 56 so that it extends below and above the conveyor 56.

The conveyor 70 includes a drive shaft 72 and idler shaft 74, the shaft 72 and 74 extending between and journalled in the side walls 16 and 18. Carried by the drive shaft 72 is a driving drum 76. A similar idler drum 78 is carried by the idler shaft 74. Entrained over the drum 76 and 78 is an endless belt 80 carrying a plurality of transverse cleats 82. The construction of the belt 80 and the cleats 82 is identical with the construction of the belt 66 and the cleats 68.

In order that the conveyors 28, 56 and 70 may be driven, the bottom wall 14 is provided with an extension 84 which is disposed outwardly of the side wall 16. Mounted on the extension 84 is an electric motor 86 having an armature shaft 88. The armature shaft 88 carries a relatively large pulley 90 and a pair of smaller pulleys 92 and 94. The pulley 90 is aligned with a pulley 96 carried by an extension of the drive shaft 30 and is connected thereto by means of a drive belt 98. The smaller pulley 92 is aligned with a larger pulley 100 carried by an extension of the drive shaft 58. Entrained over the pulleys 92 and 100 is a drive belt 102.

The pulley 94 is aligned with a pulley 104 which is mounted on the extension of the drive shaft 72. Entrained over the pulleys 94 and 104 is a drive belt 106. The drive belt 106 is twisted so that the rotation of the shaft 72 is opposite from that of the shaft 30 and 62.

Referring once again to Figure 1 in particular, it will be seen that the conveyor 28 rotates in a counter-clockwise direction. The conveyor 56 rotates also in a counter-clockwise direction. However, the conveyor 70 rotates in a clockwise direction. Thus, adjacent portions of the conveyors 28 and 56 move in opposite directions whereas adjacent portions of the conveyors 56 and 70 move in like directions.

As is best shown in Figure 1, adjacent portions of the conveyors 28 and 56 and the side walls 16 and 18 define a receptacle for bones and meat. The top wall 26 is provided with an opening 108 aligned with the space between the conveyors 28 and 56 so that bones which are to have meat removed therefrom may be deposited between these two conveyors. A hingedly mounted closure 110 is provided for the opening.

In order that meat and bones may be directed onto the lower part of the conveyor 70, there is carried by the end wall 20 a guide 112. Also, in order that meat and bones may be selectively directed from the upper part of the conveyor 70 onto the conveyor 56, there is provided a gate 114 which is pivotally mounted on the top wall 26 of the shaft 116. The gate 114 is provided with a handle 118 projecting above the top wall 26 for selectively positioning the gate 114.

In the normal operation of the meat removing apparatus 10, bones having meat thereon to be removed is deposited between the conveyors 28 and 56. The conveyor 56 moves the bones down against the conveyor 28 so that as the bones pass the knife assemblies 40, meat is stripped therefrom. The bones and meat then fall upon the lower part of the conveyor 70 and are moved upwardly thereby to a position above the upper end of the conveyor 56. The gate 114 then directs the bone and meat onto the conveyor 56 down between the conveyors 28 and 56 so that the process is repeated. This is continued until such time as it is deemed that the meat has been completely stripped from the bone. At that time the gate 114 is shifted to its dotted line position of Figure 1. The meat and bones then pass up and over the conveyor 70 and drop down in the right hand part of the housing 12.

Extending between intermediate parts of the side walls 16 and 18 adjacent to, but spaced from the wall 22 is a vertical partition wall 120. This directs the downward movement of the meat and bones from the conveyor 70 onto a meat and bone separating screen assembly 122. The meat and bone separating screen assembly 122 includes a mounting bracket 124 carried by side walls 16 and 18 on which there is mounted for reciprocatory movement a screen which is referred to by the reference numeral 126. The screen 126 has secured to the underside thereof a suitable vibrator 128 to facilitate reciprocation thereof.

Figure 3:
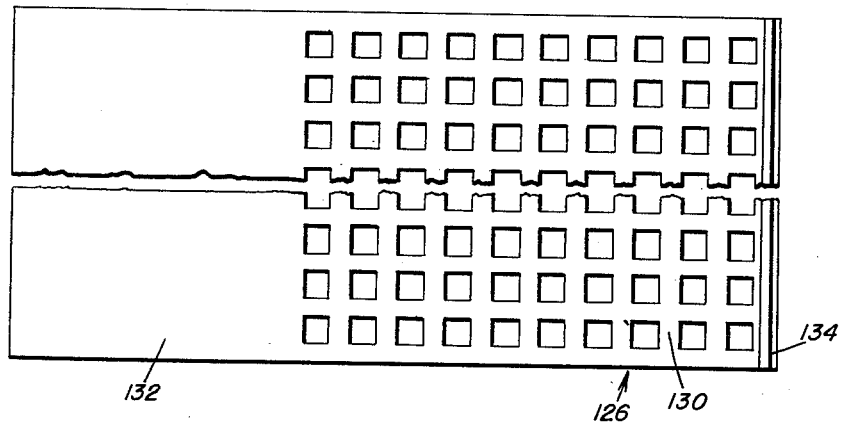
Figure 3 is an enlarged plan view of a meat and bone separating screen and shows the specific details of said screen, an intermediate portion of the screen being broken away.

Referring now to Figure 3 in particular, it will be seen that the screen 126 includes a mesh portion 130 and a non-preforated portion 132. It will also be noted that the non-perforated portion 132 is disposed to the left of the partition 120 so that all meat and bones dropping off of the conveyor 70 will drop on the mesh portion 130.

In order to assure that meat and bones do not pass the screen 126, the right hand end thereof is turned up as at 134 and is disposed behind a reflector 136 carried by the end wall 22.

The end wall 22 is provided with an access opening 138. Disposed within the bottom part of the housing 12 and resting upon the bottom wall 14 is a bone receptacle 140 and a meat receptacle 142. The receptacle 140 and 142 are positioned by a suitable stop 144 carried by the bottom wall 14. The meat receptacle 142 underlies the mesh portion 130 while the bone receptacle 140 is disposed to the left of the screen 126. Thus all meat removed from the bones will pass into the receptacle 142 while the bones will pass into the bone receptacle 140.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for removing meat from bones, said machine comprising a support, first and second conveyors carried by said support, said conveyors being disposed in downwardly converging relation with lower parts of said conveyors being closely adjacent each other, said first conveyor having meat removing knives, a third conveyor mounted below said second conveyor for receiving bones and meat from said first and second conveyors, said third conveyor extending above said second conveyor and normally returning bones and meat to said first and second conveyors.

2. A machine for removing meat from bones, said machine comprising a support, first and second conveyors carried by said support, said conveyors being disposed in downwardly converging relation with lower parts of said conveyors being closely adjacent each other, said first conveyor having meat removing knives, a third conveyor mounted below said second conveyor for receiving bones and meat from said first and second conveyors, said third conveyor extending above said second conveyor and normally returning bones and meat to said first and second conveyors, gate means disposed intermediate upper ends of said second and third conveyors for controlling movement of meat and bones between said third conveyor and said second conveyor.

3. A machine for removing meat from bones, said machine comprising a support, first and second conveyors carried by said support, said conveyors being disposed in downwardly converging relation with lower parts of said conveyors being closely adjacent each other, said first conveyor having meat removing knives, a third conveyor mounted below said second conveyor for receiving bones and meat from said first and second conveyors, said third conveyor extending above said second conveyor and normally returning bones and meat to said first and second conveyors, gate means disposed intermediate upper ends of said second and third conveyors for controlling movement of meat and bones between said third conveyor and said second conveyor, a meat separating screen carried by said support below said third conveyor.

4. A machine for removing meat from bones, said machine comprising a support, first and second conveyors carried by said support, said conveyors being disposed in downwardly converging relation with lower parts of said conveyors being closely adjacent each other, said first conveyor having meat removing knives, a meat separating screen carried by said support below said second conveyor, separate meat and bone receptacle mounted on said support below said screen.

References Cited in the file of this patent
UNITED STATES PATENTS

| | | |
|---|---|---|
| 417,885 | Sanguinetti et al. | Dec. 24, 1889 |
| 1,185,715 | Ridgely | June 6, 1916 |
| 1,741,332 | Pearl | Dec. 31, 1929 |